(12) United States Patent
Zayats et al.

(10) Patent No.: US 11,374,877 B2
(45) Date of Patent: Jun. 28, 2022

(54) RUNTIME SCHEMA FOR SERVICES IN A SWITCH

(71) Applicant: Hewlett Packard Enterprise Development LP, Houston, TX (US)

(72) Inventors: Michael Zayats, Mountain View, CA (US); Aslam M. Khan, Fremont, CA (US); Noorinbano Shaikh, Sunnyvale, CA (US); Shriharsha Shripadaraj, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 122 days.

(21) Appl. No.: 16/820,398

(22) Filed: Mar. 16, 2020

(65) Prior Publication Data

US 2021/0288920 A1 Sep. 16, 2021

(51) Int. Cl.
| | |
|---|---|
| *H04L 49/10* | (2022.01) |
| *H04L 9/08* | (2006.01) |
| *H04L 12/66* | (2006.01) |
| *H04L 49/00* | (2022.01) |
| *H04L 49/35* | (2022.01) |
| *H04L 49/45* | (2022.01) |
| *H04L 49/65* | (2022.01) |
| *H04L 49/20* | (2022.01) |

(52) U.S. Cl.
CPC ............ *H04L 49/10* (2013.01); *H04L 9/0819* (2013.01); *H04L 12/66* (2013.01); *H04L 49/70* (2013.01)

(58) Field of Classification Search
None
See application file for complete search history.

(56) References Cited

U.S. PATENT DOCUMENTS

| | | | | |
|---|---|---|---|---|
| 2016/0216978 | A1* | 7/2016 | Dangy-Caye | G06F 1/30 |
| 2018/0048639 | A1* | 2/2018 | Wundsam | G06F 9/4401 |
| 2018/0121252 | A1* | 5/2018 | Standley | G06F 9/4418 |
| 2018/0287966 | A1* | 10/2018 | Kamath | G06F 9/45558 |
| 2019/0327125 | A1* | 10/2019 | McChord | G06F 11/1464 |

* cited by examiner

*Primary Examiner* — Jay L Vogel
(74) *Attorney, Agent, or Firm* — Park Vaughan Fleming & Dowler LLP

(57) ABSTRACT

One embodiment of the present invention provides a switch. During operation, the switch parses a first schema of the switch. The first schema indicates initialization information for one or more services of the switch expressed based on one or more tags. The switch then identifies a tag of the one or more tags in the first schema based on the parsing and identifies information corresponding to the tag from a profile of the switch. Subsequently, the switch generates a second schema from the first schema based on the identified information.

20 Claims, 8 Drawing Sheets

RUNTIME SCHEMA FOR SERVICES IN A SWITCH

BACKGROUND

Field

The present disclosure relates to communication networks. More specifically, the present disclosure relates to a method and system for facilitating runtime schema for services, such as the database service, in a switch.

BRIEF DESCRIPTION OF THE FIGURES

In the figures, like reference numerals refer to the same figure elements.

DETAILED DESCRIPTION

Figure 1:
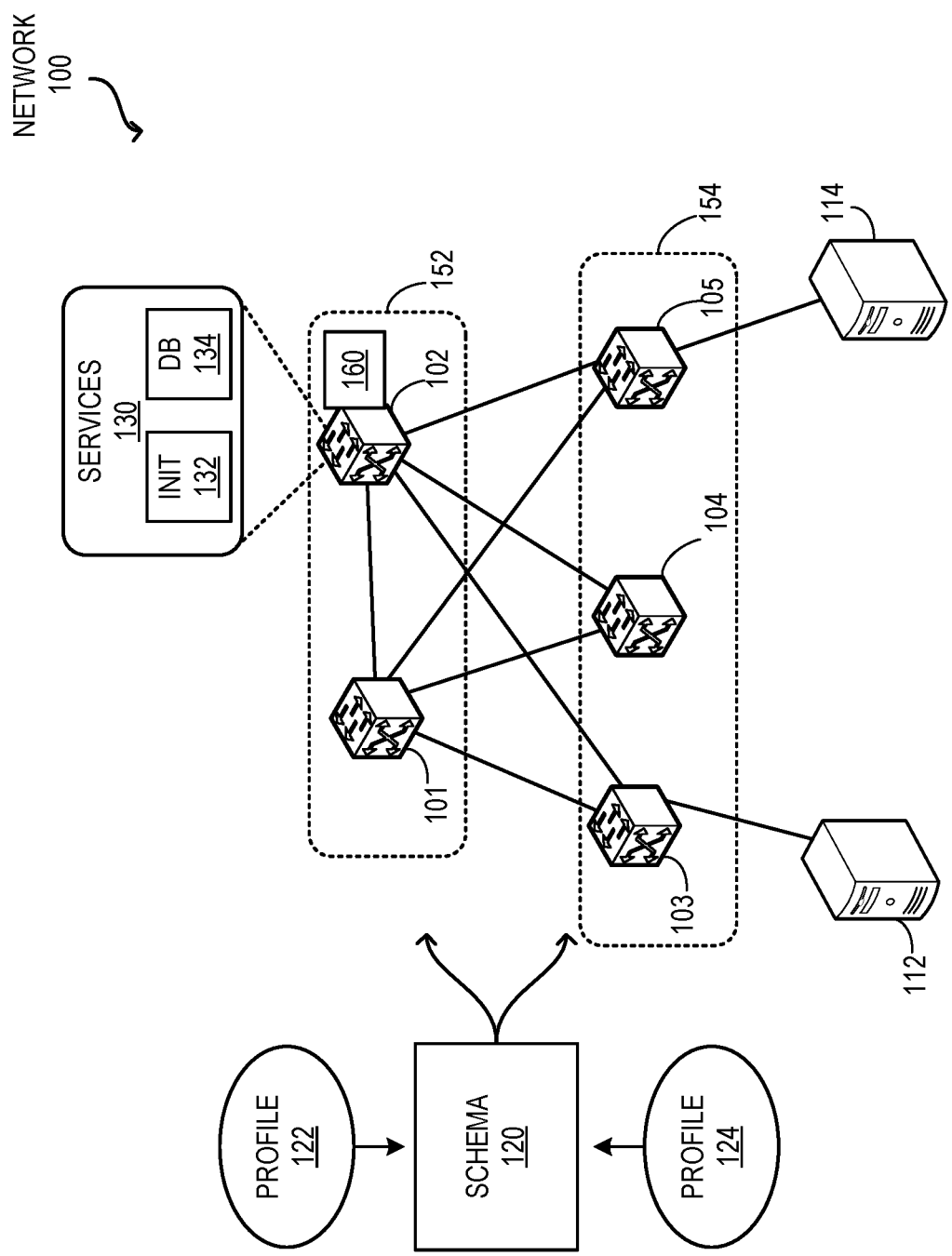
FIG. 1 illustrates an exemplary network that supports runtime schema for the switches, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The Internet is the delivery medium for a variety of applications running on physical and virtual devices. Such applications have brought with them an increasing demand for bandwidth. As a result, equipment vendors race to build larger switches with significant processing capabilities. However, the processing capability of a switch may not be sufficient to keep up with complex systems that run on such switches. For example, a respective service of a switch may require different pieces of data to initialize. However, each class of switch may have different capabilities and configurations. As a result, an administrator may individually need to provide the data needed to initialize each service on each class of switch.

In particular, a switch may deploy a database service (e.g., a database service configured to operate on a networking device). The database service may rely on a schema that defines how the configuration, status, and statistics associated with a switch are stored in different tables/columns of the database, such as the maximum number of rows or the maximum value of a field. These attributes may vary across different switch platforms (e.g., application-specific integrated circuit (ASIC) chips of a switch). In particular, the features (e.g., capacity and capabilities) of a switch can be specific to that platform.

However, a user can enable or disable some of the features of the switch at runtime. A schema of the switch can specify, in a formal language, the structure supported by one or more services of the switch (e.g., a database of the switch). If the schema of the switch is predefined during packaging time (e.g., prior to booting up), the runtime changes to the features may not be reflected in the schema. As a result, the database on the switch may not be initialized with the data in the schema. Furthermore, multiple categories or classes of switches, such as access, metro, and core switches, may run the same services even though their features may vary. Manually defining a schema for individual switches can be cumbersome and error-prone. While services, such as database services, can bring many desirable features to a switch, some issues remain unsolved regarding runtime flexibility during the initialization process of these services.

One embodiment of the present invention provides a switch. During operation, the switch parses a first schema of the switch. The first schema indicates initialization information for one or more services of the switch expressed based on one or more tags. A respective tag can include a key that can indicate an identifier (e.g., a name) and a type of a feature of the switch. Since the first schema does not specify feature information (i.e., a value representing a feature), the first schema can be used for different types of switches. The switch then identifies a tag of the one or more tags in the first schema based on the parsing and identifies information corresponding to the tag from a profile of the switch. Subsequently, the switch generates a second schema from the first schema based on the identified information.

In a variation on this embodiment, the tag includes a key associated with the information. The key can indicate a type of the key and a name of the key. The key corresponds to the feature information in the profile. For example, the feature information can be stored in the profile in association with the name of the key. As a result, the key in the tag can be used to identify the feature information in the profile.

In a variation on this embodiment, the switch searches for the key in the profile and obtains the information in association with the key.

In a variation on this embodiment, the profile indicates the capacities and capabilities of the switch.

In a further variation, the identified information in the profile indicates a capability of the switch. The switch then generates the second schema by (i) including a section of the first schema in the second schema if the capability is supported by the switch, and (ii) refraining from including the section in the second schema if the capability is not supported by the switch.

In a further variation, the identified information in the profile indicates a capacity of the switch. The switch then generates the second schema by identifying a value indicating the capacity in the identified information and replacing the tag with the identified value.

In a variation on this embodiment, the profile is specific to a type of the switch, and the schema is generic for multiple types of switches.

In a variation on this embodiment, the switch initializes the one or more services based on the second schema.

In a variation on this embodiment, the one or more services of the switch can include a database service, a command-line interface (CLI) service, a representational state transfer (REST) service, and a web service.

In a variation on this embodiment, the first schema and the profile are packaged with the switch; and the second schema is generated at a boot time of the switch.

The embodiments described herein solve the problem of dynamically configuring services on a switch based on the features of the switch by (i) facilitating a generic schema that uses tags corresponding to different switch features, and (ii) obtaining information associated with the features from the profile of the switch and replacing the tags with corresponding obtained information during booting up. In this way, the switch can generate a runtime schema that reflects the features of the switch. Here, the features may represent the capacity and/or capabilities of the switch.

With existing technologies, a number of services of the switch may initialize itself based on a schema. Examples of a switch service include, but are not limited to, database services, command-line interface (CLI) services, representational state transfer (REST) services, and web interface services. The respective limits of media access control (MAC) addresses, address resolution protocol (ARP) resolutions, access control lists (ACLs), etc. can be defined in the schema for the switch. The services are initialized based on the information in the schema (e.g., the maximum number of rows in a database table). However, such information can be different in different switches, such as different hardware platforms/ASICs, different classes of switches, etc. As a result, a different schema needs to be defined for each type of switches. Defining schema for each type of switches can be tedious and error-prone.

Furthermore, the hardware/ASIC profile of a switch is packaged in the switch image to represent the capacities and/or capabilities of the switch. The hardware/ASIC profile, which is also referred to as the profile, of a switch specifies the hardware capabilities, such as limits of the hardware, of the switch. In some switches, an administrator may configure a piece of hardware that dictates the limits of that piece of hardware. To facilitate this, the administrator may change the profile of the switch at runtime, which allows the switch to initialize the ASIC according to the profile.

For such a switch, the features of the switch cannot be hardcoded at compile time to generate a switch image. In other words, the feature information may not be manually specified in the code of the switch image prior to the compilation of the code. As a result, the features of such a switch may not be known before the switch boots up. Hence, the schema for such a switch may be challenging to define. In addition, the services that use the schema may need to validate the schema based on the profile to ensure that the schema is correctly defined. However, some services may not have access to the profile. These limitations can impose significant limitations on the types of services that the switch may facilitate.

To solve this problem, a generic schema can be defined that can represent the features of a switch based on corresponding tags. A tag can include a key that can indicate an identifier (e.g., a name) and a type of the feature. Since the generic schema does not specify the feature information (i.e., a value representing a feature), the generic schema can be used for different types of switches. Furthermore, the profile of the switch can include the key and corresponding feature information. The switch can be packaged with the generic schema and the profile (e.g., with the switch image). It should be noted that since the profile of a switch indicates the hardware/ASIC capabilities of a switch, the profile can be switch specific.

During the bootup process, the switch can parse the generic schema. Whenever the switch identifies a tag in the generic schema, the switch can look up the key in the profile and obtain the corresponding feature information. The switch can then replace the tag with the feature information. In this way, the switch can generate a runtime schema that can incorporate the feature information of a profile even if the profile is defined during runtime. Furthermore, since the runtime schema is generated from a generic schema, the same generic schema can be used for different switches regardless of underlying hardware capabilities.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction."

Switch and Network Architecture

FIG. 1 illustrates an exemplary network that supports runtime schema for the switches, in accordance with an embodiment of the present application. As illustrated in FIG. 1, a network 100 includes switches 101, 102, 103, 104, and 105. End devices 112 and 114 can be coupled to switches 103 and 105, respectively. In some embodiments, network 100 is a Gen-Z network and a respective switch of network 100, such as switch 102, is a Gen-Z component. A Gen-Z network can be a memory-semantic fabric that can be used to communicate to the devices in a computing environment. By unifying the communication paths and simplifying software through simple memory-semantics, Gen-Z components can facilitate high performance solutions for complex systems. Under such a scenario, communication among the switches in network 100 is based on memory-semantic fabric. In some further embodiments, network 100 is an Ethernet and/or IP network, and a respective switch of network 100, such as switch 102, is an Ethernet switch and/or IP router. Under such a scenario, communication among the switches in network 100 is based on Ethernet and/or IP.

Network 100 can include different types of switches. Switches 101 and 102 can be switch type 152, and switches 103, 104, and 105 can be switch type 154. The types of switches can be based on one or more of: hardware capabilities, switch features, and deployment types. For example, switch type 152 can indicate aggregate switches, and switch type 154 indicates edge switches. Similarly, switch type 152 can indicate one platform (e.g., switch series or class of switches), and switch type 154 can indicate another platform. The services on the switches of network 100 are initialized based on the information in the respective schema of the switches. However, such information can be different in switch types 152 and 154. For example, the maximum number of MAC addresses supported by switch types 152 and 154 can be different. As a result, a different schema needs to be defined for each of switch types 152 and 154. Defining schema for each type of switches can be tedious and error-prone.

Furthermore, the profile of a respective switch in network 100 is packaged in the switch image to represent the capacities and/or capabilities of the switch. Since the hardware capacity and capabilities of switch types 152 and 154 can be different, switch types 152 and 154 are associated with corresponding profiles 122 and 124, respectively. It should be noted that the capacity of a switch may indicate different maximum values (e.g., a maximum number of MAC addresses, a maximum time to leave (TTL) value, a maximum number of network analytics engine (NAE) agents supported by the switch, etc.) supported by the switch. The capabilities of the switch may indicate whether the switch is capable of executing an operation or may facilitate a feature.

Profiles 122 and 124 specify the hardware capacity and/or capabilities, such as limits of the hardware, of the switches of types 152 and 154, respectively. In some embodiments, profiles 122 and 124 can be represented as corresponding "profile" files for switch types 152 and 154, respectively, and are loaded into the corresponding switches. In addition, an administrator can configure a piece of hardware that dictates the limits of that piece of hardware. To facilitate this, the administrator may change profiles 122 and/or 124 at runtime and reboot the corresponding switches. This process allows the corresponding switches to initialize the ASIC according to profiles 122 and/or 124. Consequently, the features of a configurable switch type cannot be hardcoded at compile time to generate a switch image.

Suppose that an administrator specifies a profile for switch type 154. For example, by selecting a layer-2 profile at runtime, the administrator can cause switches 103, 104, and 105 to operate as layer-2 switches. As a result, the features of switches 103, 104, and 105 may not be known before these switches boot up. Hence, the schema for switches 103, 104, and 105 may be challenging to define. In addition, the services that use the schema may need to validate the schema based on profile 124 to ensure that the schema is correctly defined. However, some services may not have access to profile 154. These limitations can impose significant limitations on the types of services that switch type 154 may facilitate.

To solve this problem, a generic schema 120 can be defined for all switch types that can include tags instead of specific values. A respective switch of network 100 can be packaged with schema 120 and a corresponding profile. For example, switch 102 can be packaged with schema 120 and profile 122, and switch 103 can be packaged with schema 120 and profile 124. Switch 102 can run a number of services 130. When switch 102 boots up, an initialization service 132 parse schema 120 and replace the tags in schema 120 with corresponding information from profile 122. By replacing the tags with corresponding values, service 132 can generate a runtime schema 160 for switch 102. Schema 160 can specify capacity (e.g., max attributes) and capabilities (e.g., supported features) of switch 102 based on profile 122. As a result, other services, such as database service 134 can load schema 160 and initialize themselves according to the capacity and/or capabilities of switch 102.

Figure 2:
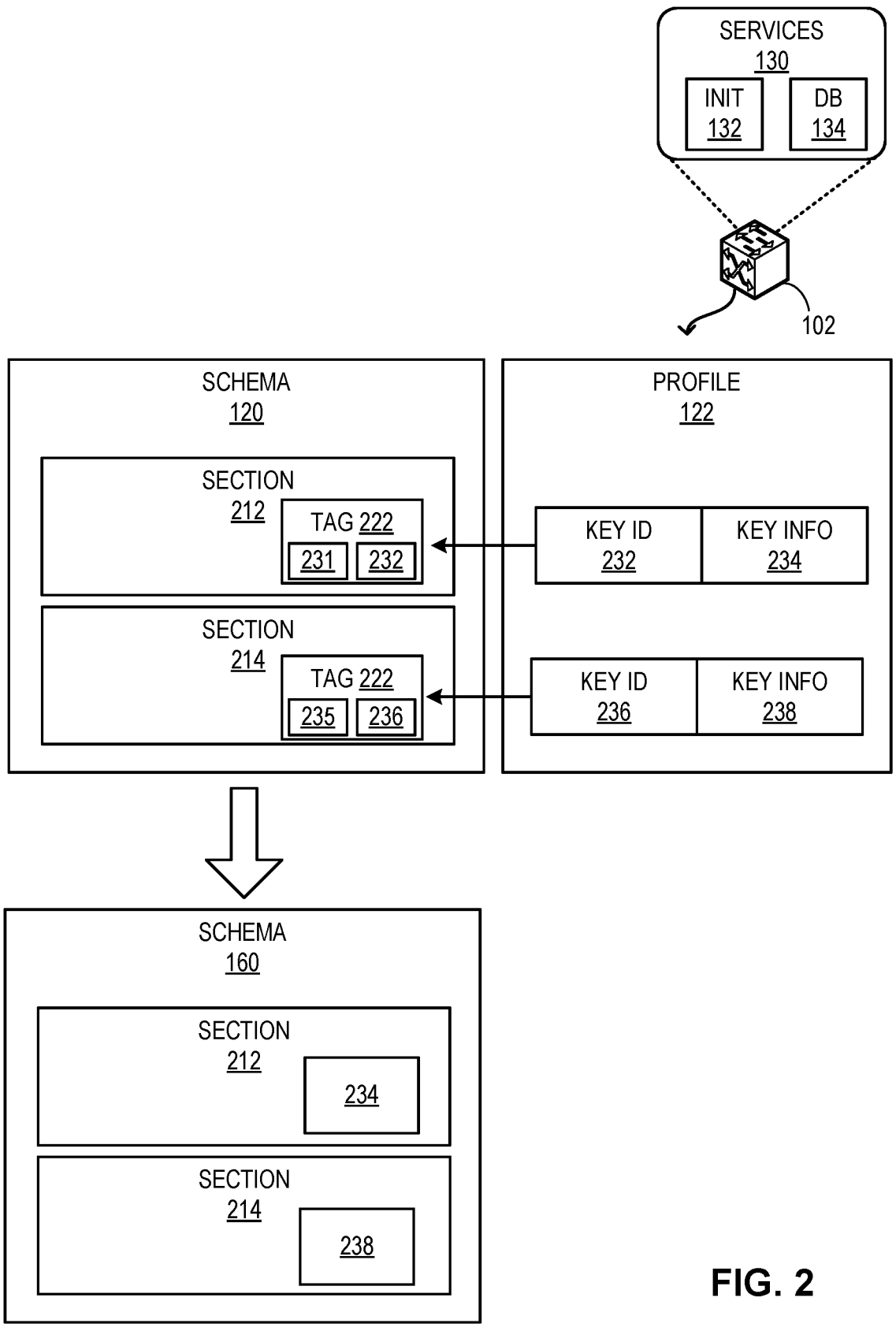
FIG. 2 illustrates an exemplary process for generating a runtime schema, in accordance with an embodiment of the present application.

FIG. 2 illustrates an exemplary process for generating a runtime schema, in accordance with an embodiment of the present application. At boot time, generic schema 120 in switch 120 can represent the features of switch 120 based on corresponding tags. Schema 120 can include a number of sections 212 and 214. A respective section can specify and indicate a feature of switch 102. Sections 212 and 214 can include tags 222 and 224, respectively. A respective tag can represent the capacity and/or capability associated with the section. For example, section 212 can indicate the MAC address learning configuration for switch 102. Tag 222 can then indicate a maximum number of MAC addresses that switch 102 can learn.

Tag 222 can include a key that can indicate a type 231 and an identifier (or a name) 232 of the feature associated with tag 222. Similarly, tag 224 can include a key that can indicate a type 235 and an identifier 236 of the feature associated with tag 224. Profile 122 of switch 102 can include key identifier 232 and key information 234 corresponding to the feature associated with section 222. Profile 122 can also include key identifier 236 and key information 238 corresponding to the feature associated with section 222.

During the bootup process, switch 102 can parse schema 120. Whenever switch 102 identifies tag 222 in schema 120, switch 102 can look up key identifier 232 in profile 122 and obtain the corresponding information 234 from profile 122. Switch 102 can use type 231 of tag 222 to determine the type of information associated with tag 222. Type 231 can indicate that tag 222 corresponds to the capacity of a specific feature of switch 102 or a capability of switch 102. Switch 102 can then replace tag 222 with information 234 in schema 120. In the same way, switch 102 can obtain information 238 from profile 122 based on identifier 236, and replace tag 224 with information 238 in schema 120.

In this way, switch 102 can generate a runtime schema 160 that can incorporate information 234 and 238 of profile 122. Schema 160 includes information 234 and 238 in sections 212 and 222, respectively. As a result, schema 160 is generated as a switch-specific schema for switch 102. Consequently, services 130 can use schema 160 for initialization. It should be noted that even if profile 122 is defined during runtime, initialization service 132 of switch 102 can still generate schema 160. Furthermore, since schema 160 is generated from generic schema 120, the same generic schema 120 can be used for different switches regardless of underlying hardware capabilities.

In schema 160, the tags are changed to the maximum values indicated by the capacity defined for the related feature in profile 122. For example, if a section in schema 160 corresponds to a column for database service 134, the maximum value supported by the column is represented by the capacity defined for that column in profile 122. Similarly, in schema 160, the maximum number of rows for a table can be represented by the capacity defined for that feature in profile 122. In addition, a particular capability is included in schema 160 if profile 122 specifies that capability for switch 102. When schema 160 is generated based on profile 122, switch 102 can start database service 134 and other services that rely on schema 160. Since schema 160 can be generated prior to the initialization of these services, the services can remain unaware of the runtime schema generation process.

If a field in schema 120 is "max," instead of a maximum value, a corresponding tag can be {"capacity": "key_name"}. Here, "capacity" can indicate a key type and "key_name" can indicate a key identifier. The phrase "capacity" can indicate that the tag corresponds to a maximum value that indicates a capacity. Similarly, schema 120 can include "capability" tags (i.e., with a type "capability") to indicate whether switch 120 can support a particular feature. With the "capability" tag, a section of schema 120 can be included in schema 160 if profile 122 indicates that the corresponding capability is enabled. And if a negative tag, "!capability," is used in schema 120, the corresponding section can be included if that capability is not present in profile 122.

Suppose that profile 122 includes the following keys and their corresponding values:

key: capacity_1
value: 1234
key: capacity_2
value: 5
key: capacity_3
value: 67

In profile 122, key identifier 232 can be "capacity_1" and the corresponding key information can be "1234."

If section 212 corresponds to a column-X, section 212 in schema 120 can be:

```
"column-X": {
    "type": {
        "minInteger": 1,
        "maxInteger": {"capacity":"capacity_2"},
        "type": "integer"
    }
}
```

Here, tag 222 is {"capacity":"capacity_2"}, type 231 is "capacity," and identifier 232 (i.e., "key_name") is "capacity_2," which can represent a corresponding maximum value. When switch 102 replaces tag 222 to generate schema 160, section 212 in schema 160 becomes:

```
"column-X": {
    "type": {
        "minInteger": 1,
        "maxInteger": 5,
        "type": "integer"
    }
}
```

If section 212 corresponds to a column-Y, which can be a set of values, section 212 in schema 120 can be:

```
"column-Y": {
    "category": "status",
    "type": {
        "key": "string",
        "min": 0,
        "max": {"capacity": "capacity_1"}
    }
}
```

Here, tag 222 is {"capacity": "capacity_1"}, type 231 is "capacity," and identifier 232 is "capacity_1," which can represent a maximum number of elements in the set for column-Y. When switch 102 replaces tag 222 to generate schema 160, section 212 in schema 160 becomes:

```
"column-Y": {
    "category": "status",
    "type": {
        "key": "string",
        "min": 0,
        "max": 1234
    }
}
```

If section 212 corresponds to table-Z, section 212 in schema 120 can be:

```
"table-Z": {
    "columns": {
        .
        .
        },
        "maxRows": {"capacity": "capacity_3"}
        .
        .
    }
```

Here, tag 222 is {"capacity": "capacity_3"}, type 231 is "capacity," and identifier 232 is "capacity_3," which can represent the maximum number of rows a corresponding table may support. When switch 102 replaces tag 222 to generate schema 160, section 212 in schema 160 becomes:

```
"table-Z": {
    "columns": {
        .
        .
        },
        "maxRows": 67
        .
        .
    }
```

Similar to "capacity" tags, schema 120 can also include "capability" tags. Based on the capabilities indicated in profile 122, schema 160 can indicate correct column category, enum, valueMaps, and doc. If section 212 is a category, valueMap, doc, or enum section, tag 222 can indicate a corresponding capability that can indicate whether section 212 should be included in schema 160. Tag 222 can be a "capability" tag or a "!capability" tag (i.e., a negative capability tag). If tag 222 is a "capability" tag, switch 102 includes section 212 in schema 160 if profile 122 indicates that switch 102 is equipped with the capability. On the other hand, if tag 222 is a "!capability" tag, switch 102 includes section 212 in schema 160 if profile 122 indicates that switch 102 is not equipped with the capability.

If section 212 corresponds to a column-A category, section 212 in schema 120 can be:

```
"column-A": {
    "capability_test": {
        "category": "configuration",
        "capability_list": ["capability_1", "!capability_2"],
        "type": {
            "max": "unlimited",
            "valueType": "string",
            "min": 0,
        }
    }
```

Here, tag 222 is "capability_list": ["capability_1", "!capability_2"] and type 231 is "capability_list." and identifier 232 is ["capability_1", "!capability_2"]. The column-A category is added to schema 160 if at least one of the capabilities (e.g., "capability_1") or none of the negative capabilities (e.g., "!capability_2") is found in profile 122. Otherwise, the column category is dropped. In this way, if switch 102 is not capable of a capability, the corresponding column may not be available for configuration via a user interface. Therefore, column-A can be configurable from the user interface if switch 102 has capability_1 and does not have capability_2.

If section 212 corresponds to a schema documentation, section 212 in schema 120 can be:

```
column-B {
  "doc": [
    "value_1: value_1 represents...",
    {
      "capability_list": [ "!capability 3"],
      "text": ["value _2: value _2 represents...",
      "'value_3': value_3 represents..."]
    },
    {
      "capability_list": [" capability_3", " capability_4"],
      "text": ["value _4: value _4 represents..."]
    },
    "value_5: value_5 represents..."
  ]
}
```

The corresponding doc element is retained in schema 160 if at least one of the capabilities (e.g., "capability_4") or none of the negative capabilities (e.g., "! capability_3") is found in profile 122, corresponding to the capability of switch 102.

Figure 3:
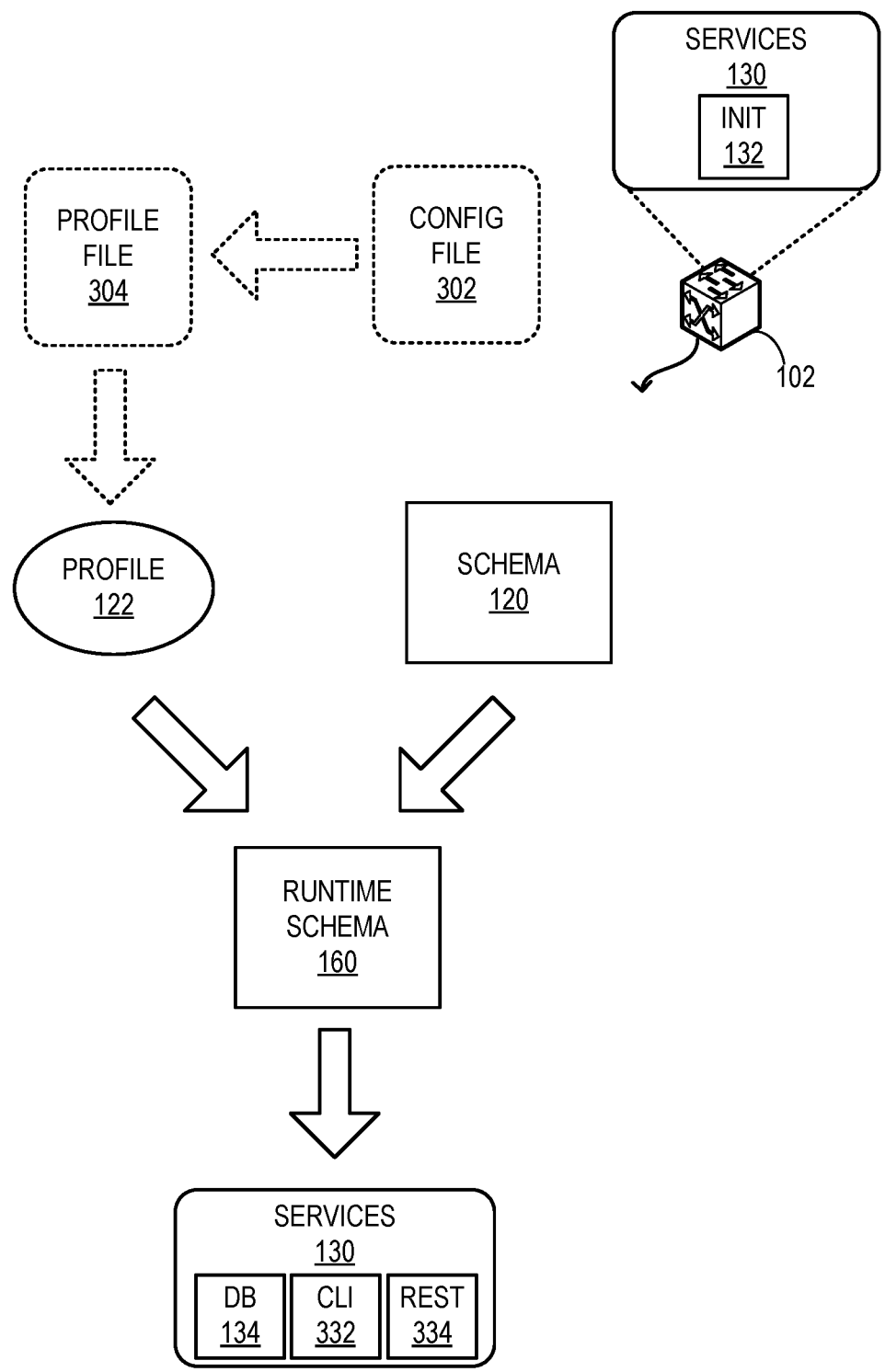
FIG. 3 illustrates an exemplary generation of a runtime schema in a switch and initializing services using the runtime schema, in accordance with an embodiment of the present application.

FIG. 3 illustrates an exemplary generation of a runtime schema in a switch and initializing services using the runtime schema, in accordance with an embodiment of the present application. During operation, a user can select a profile for switch 102. For example, switch 102 can be packaged with a profile file 304, which can include a number of profiles corresponding to layer-2, layer-3, core, aggregate, access, leaf, etc. If the user selects the layer-2 profile, switch 102 can be operated as a layer-2 switch. The user can indicate in a configuration file 302 of switch 102. When switch 102 is rebooted, the layer-2 profile of profile file 304 becomes profile 122 of switch 102. Consequently, switch 102 is configured as a layer-2 switch based on profile 122. Similarly, if the user selects the access profile, switch 102 can be operated as an access switch. If the user does not specify user profile in configuration file 302, a default profile in profile file 304 is selected as profile 122. Switch 102 is also packaged with generic profile 120.

When switch 102 is rebooted and profile 122 configures the underlying hardware of switch 102, service 132 can parse schema 120, identify tags in schema 120, identify corresponding information in profile 122, and generates runtime schema 160 based on the information in profile 122. Other services, such as database service 134, CLI service 332, and REST service 334, then initialize based on runtime schema 160. Since these services are not aware of generic schema 120, services 134, 332, and 334 can initialize without requiring any changes to accommodate the dynamic runtime generation of schema 160.

Operations

Figure 4A:
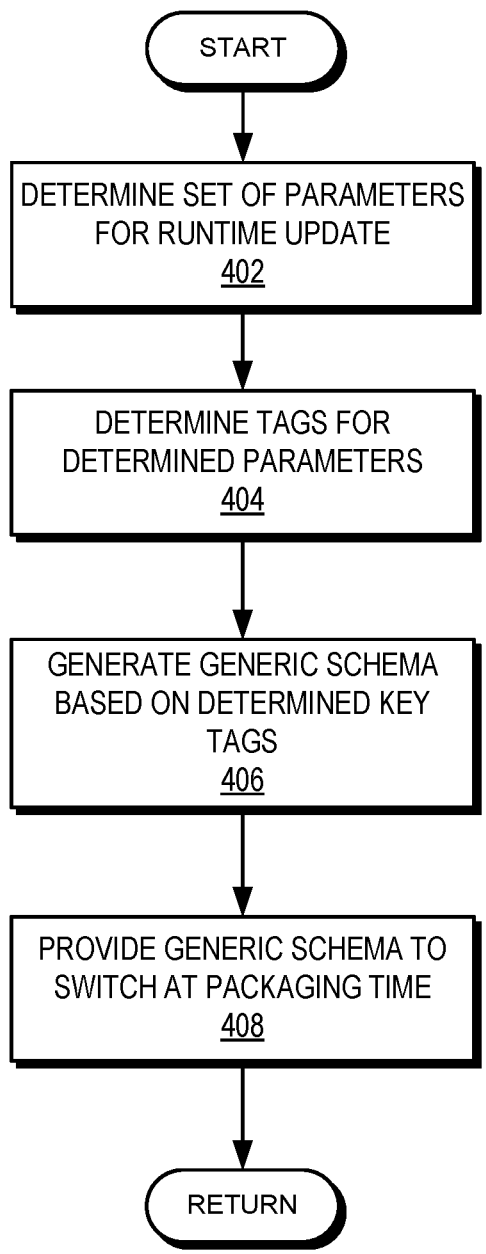
FIG. 4A presents a flowchart illustrating the process of a management system incorporating a generic schema in a switch, in accordance with an embodiment of the present application.

FIG. 4A presents a flowchart illustrating the process of a management system incorporating a generic schema in a switch, in accordance with an embodiment of the present application. During operation, the system determines a set of parameters for runtime update (operation 402). Subsequently, the system determines the tags for the determined parameters (operation 404). The system then generates a generic schema based on the determined tags (operation 406) and provides the generic schema to the switch at packaging time (operation 408). The management system can be a switch management system that allows a user to configure the switch.

Figure 4B:
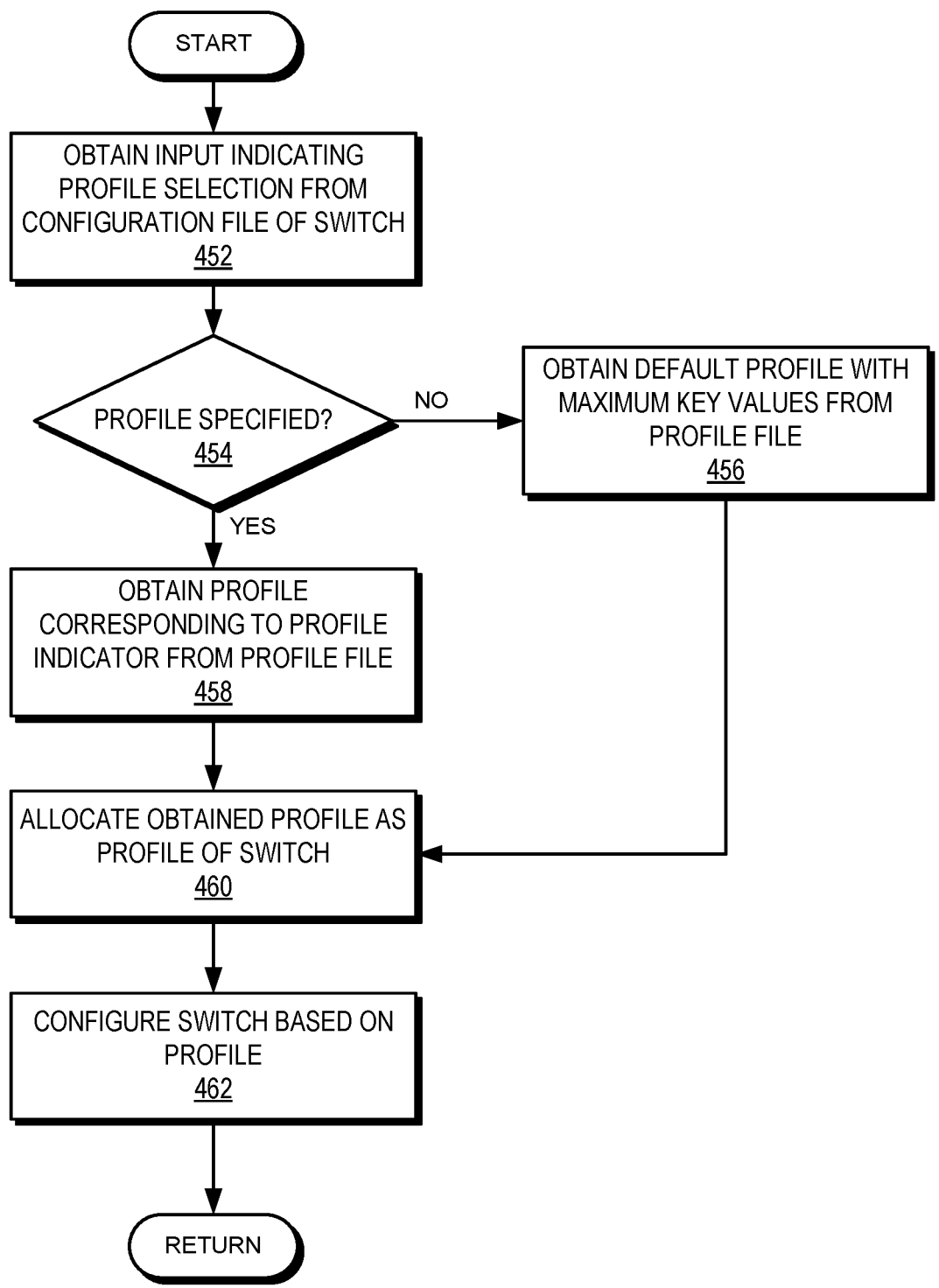
FIG. 4B presents a flowchart illustrating the process of a switch selecting a profile for runtime schema generation, in accordance with an embodiment of the present application.

FIG. 4B presents a flowchart illustrating the process of a switch selecting a profile for runtime schema generation, in accordance with an embodiment of the present application. In some embodiments, the operations of this process can be supported based on an initialization service on the switch. During operation, the switch obtains an input indicating profile selection from a configuration file of the switch (operation 452). The input can be a value specified in the configuration file (e.g., "profile=5"). The value can correspond to one of the profiles defined in a profile file of the switch.

The switch then determines whether a profile is specified in the configuration file (operation 554). If no profile is specified, the switch obtains the default profile with maximum key values from the profile file (operation 456). On the other hand, if the profile is specified, the switch obtains the profile corresponding to a profile indicator from the profile file (operation 458). Upon obtaining the profile (operation 456 or 458), the switch allocates the obtained profile as the profile of the switch (operation 460). The switch then configures itself based on the profile (operation 462) (e.g., by rebooting the switch and enabling hardware features specified in profile).

Figure 5A:
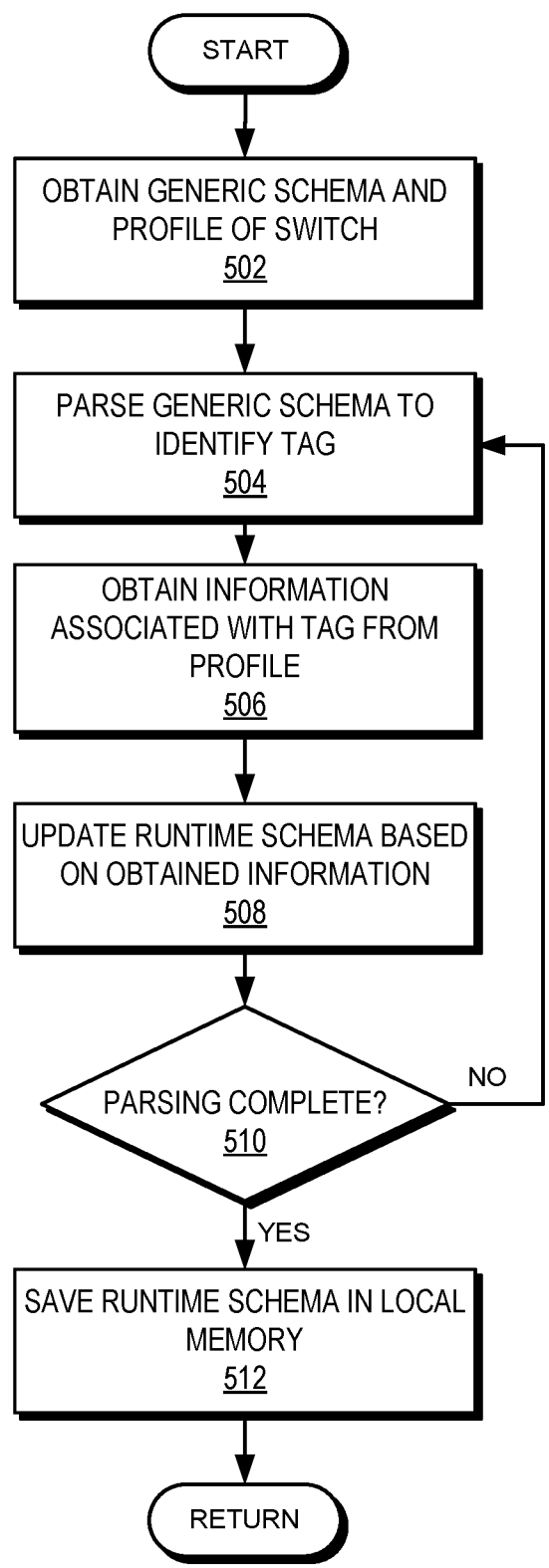
FIG. 5A presents a flowchart illustrating the process of a switch generating a schema at runtime based on the profile of the switch, in accordance with an embodiment of the present application.

FIG. 5A presents a flowchart illustrating the process of a switch generating a schema at runtime based on the profile of the switch, in accordance with an embodiment of the present application. In some embodiments, the operations of this process can be supported based on an initialization service on the switch. During operation, the switch obtains the generic schema and the profile of the switch (operation 502) and parses the generic schema to identify a tag (operation 504). The switch then obtains information associated with the tag from the profile (operation 506). The switch updates the runtime schema based on the obtained information (operation 508).

If the tag is a capacity tag, the update operation includes replacing the tag with a corresponding value specified in the obtained information. On the other hand, if the tag is a capability tag, the update operation includes determining whether a particular capability is supported by the switch based on the information. Based on the determination, the update operation can include a section of the generic schema in the runtime schema. The switch then checks whether the parsing is complete (operation 510). If the parsing is not complete, the switch continues parsing the generic schema to identify a tag (operation 504). If the parsing is complete, the switch saves the runtime schema in the local memory (operation 512).

Figure 5B:
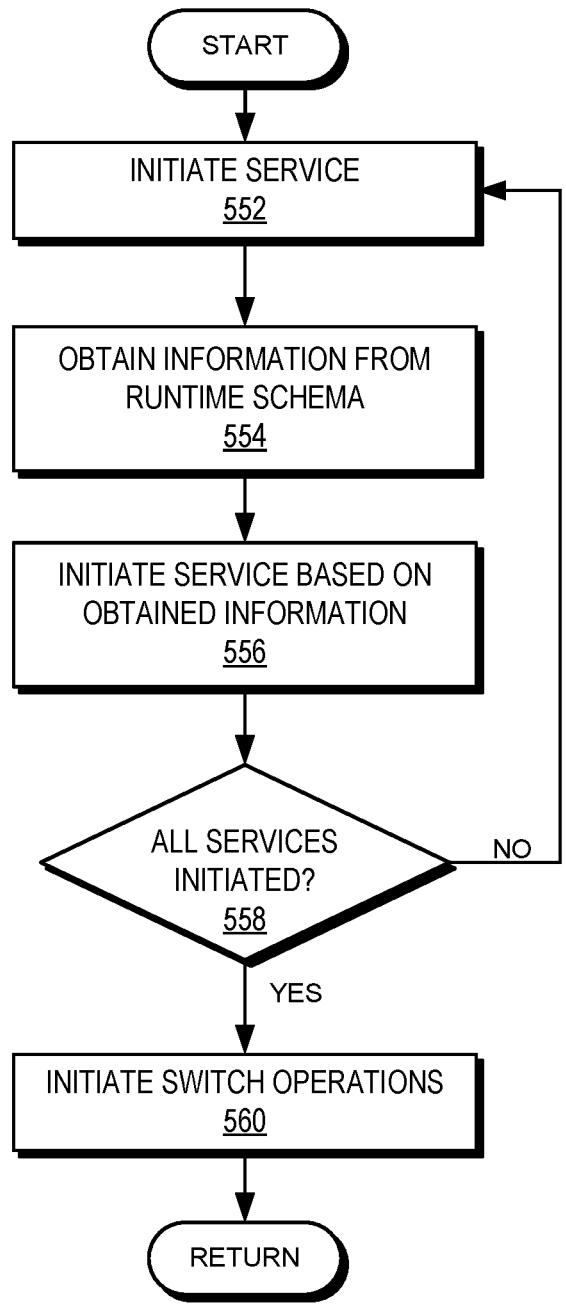
FIG. 5B presents a flowchart illustrating the process of a switch initializing services based on a runtime schema, in accordance with an embodiment of the present application.

FIG. 5B presents a flowchart illustrating the process of a switch initializing services based on a runtime schema, in accordance with an embodiment of the present application. During operation, the switch initiates a service (operation 552) and obtains information from the runtime schema (operation 554). The switch then initiates the service based on the obtained information (operation 556). Subsequently, the switch checks whether all services have been initiated (operation 558). If not, the switch continues with the initiation of services (operation 552). On the other hand, if all services have been initiated, the switch initiates the switch operations 560).

Exemplary Switch

Figure 6:
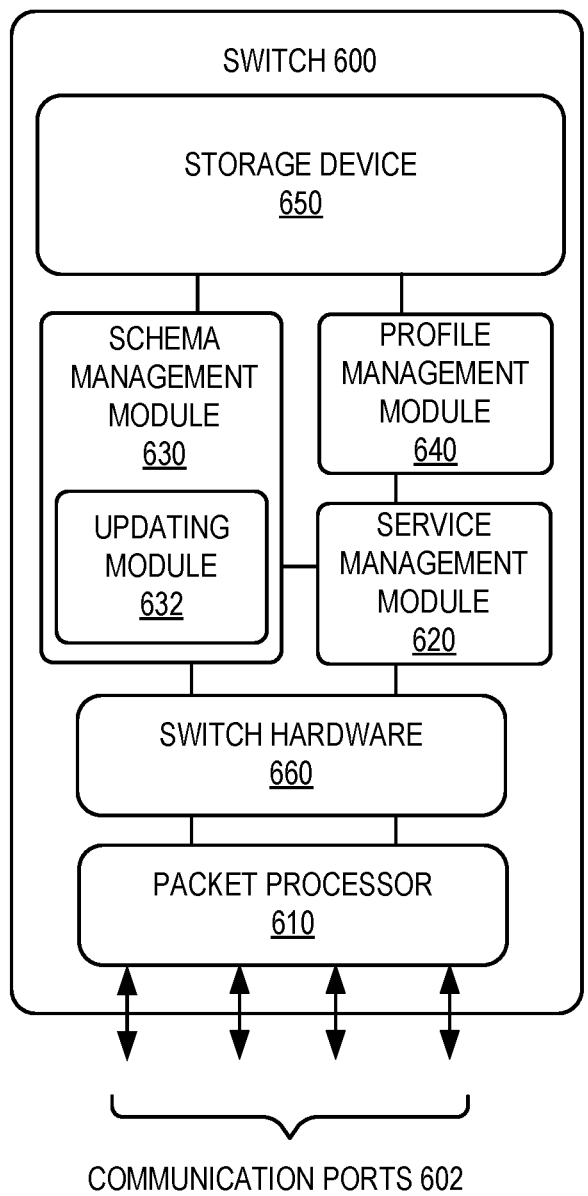
FIG. 6 illustrates an exemplary switch that supports runtime schema, in accordance with an embodiment of the present application.

FIG. 6 illustrates an exemplary switch that supports runtime schema, in accordance with an embodiment of the present application. In this example, a switch 600 includes a number of communication ports 602, a packet processor 610, a service management module 620, a schema management module 630, a profile management module 640, and a storage device 650. Switch 600 can also include switch hardware (e.g., processing hardware of switch 600, such as its ASIC chips), which includes information based on which switch 600 processes packets (e.g., determines output ports for packets). Packet processor 610 extracts and processes header information from the received frames. Packet processor 610 can identify a switch identifier (e.g., a MAC address and/or an IP address) associated with the switch in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets.

During operation, schema management module 630 can store a generic schema in switch 600 (e.g., in storage device 650). Profile management schema 640 can maintain a profile (e.g., a hardware profile) of switch 600. The profile can indicate the capacities and capabilities of switch 600. When switch 600 boots up, updating module 632 can parse the generic schema and identify tags in the generic schema. Based on the tags, updating module 632 can obtain corresponding information from the profile of switch 600. Updating module 632 can then generates a runtime schema using the obtained information from the profile. Service management module 620 can then initialize one or more services of switch 600 based on the runtime schema.

Note that the above-mentioned modules can be implemented in hardware as well as in software. In one embodiment, these modules can be embodied in computer-executable instructions stored in a memory which is coupled to one or more processors in switch 600. When executed, these instructions cause the processor(s) to perform the aforementioned functions.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising: a processor; and a storage device coupled to the processor and storing instructions, which when executed by the processor cause the processor to perform a method, the method comprising:
   parsing, during booting up the switch, a first schema of the switch, wherein the first schema indicates initialization information for one or more services of multiple switch types associated with a plurality of switches of the switch generically expressed based on one or more tags;
   identifying a tag of the one or more tags in the first schema based on the parsing;
   identifying, in response to determining a match for the tag, a first piece of switch-specific information corresponding to the tag from a profile specific to a switch type associated with the switch, wherein the first piece of switch-specific information in the profile includes a value indicating a capacity of the switch;
   and generating a second schema from the first schema by incorporating the value indicating the capacity into the first schema based on the identified tag wherein the second schema includes information for initializing the one or more services at the switch.

2. The switch of claim 1, wherein the tag includes a key associated with the switch-specific information, and wherein the key indicates a type of the key and a name of the key.

3. The switch of claim 2, wherein the method further comprises: searching for the key in the profile; and obtaining the switch-specific information based on the search for the key.

4. The switch of claim 1, wherein the profile indicates capacities and capabilities of the switch, wherein the capacities of the switch include limits of the hardware of the switch, and wherein the capabilities of the switch include a set of operations and features supported by the switch.

5. The switch of claim 1, wherein the method further comprises:
   identifying a second tag of the one or more tags in the first schema; and
   identifying, based on the second tag, a second piece of switch-specific information in the profile indicating a capability of the switch; and wherein generating the second schema further comprises: including a section of the first schema in the second schema in response to the capability being supported by the switch; and refraining from including the section in the second schema in response to the capability not being supported by the switch.

6. The switch of claim 1, wherein the method further comprises initializing, during booting up the switch, a subset of the one or more services based on the information in the second schema.

7. The switch of claim 1, wherein the one or more services include:
   a database service;
   a command-line interface (CLI) service;
   a representational state transfer (REST) service; and
   a web service.

8. The switch of claim 1, wherein the first schema and the profile are packaged with the switch prior to booting up the switch.

9. The switch of claim 1, wherein the method further comprises:
  determining a set of parameters for runtime update; and
  determining the one or more tags based on the set of parameters.

10. The switch of claim 1, wherein the method further comprises:
  determining, during booting up the switch, a profile indicator in a configuration file of the switch; and
  obtaining the profile based on the profile indicator.

11. A method comprising:
  parsing, during booting up the switch, a first schema of the switch, wherein the first schema indicates initialization information for one or more services of multiple switch types associated with a plurality of switches of the switch generically expressed based on one or more tags;
  identifying a tag of the one or more tags in the first schema based on the parsing;
  identifying, in response to determining a match for the tag, a first piece of switch-specific information corresponding to the tag from a profile specific to a switch type associated with the switch, wherein the first piece of switch-specific information in the profile includes a value indicating a capacity of the switch;
  and generating a second schema from the first schema by incorporating the value indicating the capacity into the first schema based on the identified tag wherein the second schema includes information for initializing the one or more services at the switch.

12. The method of claim 11, wherein the tag includes a key associated with the switch-specific information, and wherein the key indicates a type of the key and a name of the key.

13. The method of claim 12, wherein the method further comprises: searching for the key in the profile; and obtaining the switch-specific information based on the search for the key.

14. The method of claim 11, wherein the profile indicates capacities and capabilities of the switch, wherein the capacities of the switch include limits of the hardware of the switch, and wherein the capabilities of the switch include a set of operations and features supported by the switch.

15. The method of claim 11, further comprises:
  identifying a second tag of the one or more tags in the first schema; and
    identifying, based on the second tag, a second piece of switch-specific information in the profile indicating a capability of the switch; and wherein generating the second schema further comprises: including a section of the first schema in the second schema in response to the capability being supported by the switch; and refraining from including the section in the second schema in response to the capability not being supported by the switch.

16. The method of claim 11, wherein the method further comprises initializing, during booting up the switch, a subset of the one or more services based on the information in the second schema.

17. The method of claim 11, wherein the one or more services include:
  a database service;
  a command-line interface (CLI) service;
  a representational state transfer (REST) service; and
  a web service.

18. The method of claim 11, wherein the first schema and the profile are packaged with the switch prior to booting up the switch.

19. The method of claim 11, further comprising:
  determining a set of parameters for runtime update; and
  determining the one or more tags based on the set of parameters.

20. The method of claim 11, further comprising:
  determining, during booting up the switch, a profile indicator in a configuration file of the switch; and
  obtaining the profile based on the profile indicator.

* * * * *